(12) United States Patent
Green (10) Patent No.: US 10,773,431 B2
(45) Date of Patent: Sep. 15, 2020

(54) STRUCTURAL COMPOSITION AND METHOD

(71) Applicant: Marhaygue, LLC, Pawleys Island, SC (US)

(72) Inventor: Guerry E. Green, Georgetown, SC (US)

(73) Assignee: Marhaygue, LLC, Pawley's Island, SC (US)

( * ) Notice: Subject to any disclaimer, the term of this patent is extended or adjusted under 35 U.S.C. 154(b) by 0 days.

(21) Appl. No.: 16/504,850

(22) Filed: Jul. 8, 2019

(65) Prior Publication Data

US 2019/0337198 A1 Nov. 7, 2019

Related U.S. Application Data

(63) Continuation of application No. 16/016,942, filed on Jun. 25, 2018, now Pat. No. 10,343,313, which is a
(Continued)

(51) Int. Cl.
*B29C 43/28* (2006.01)
*B29C 43/52* (2006.01)
(Continued)

(52) U.S. Cl.
CPC .............. *B29C 43/28* (2013.01); *B29C 43/34* (2013.01); *B29C 43/46* (2013.01); *B29C 43/52* (2013.01);
(Continued)

(58) Field of Classification Search
CPC ....... B29C 43/28; B29C 55/06; B29C 48/156; B29C 48/0018; B29C 48/05; B29C 48/15;
(Continued)

(56) References Cited

U.S. PATENT DOCUMENTS 4,356,228 A * 10/1982 Kobayashi ............ B29C 70/025
156/285
4,661,303 A * 4/1987 Chum ...................... B32B 7/10
264/173.16
(Continued)

FOREIGN PATENT DOCUMENTS

WO 2011015635 A1 2/2011

*Primary Examiner* — Jeffrey M Wollschlager
(74) *Attorney, Agent, or Firm* — Nexsen Pruet, LLC; Michael A. Mann (57) ABSTRACT

A structural polymeric composite includes a stiffening layer. The composite is made in a continuous extrusion process in which the stiffening layer is pulled through a cross-head die as a polymer is extruded over it. The layer includes a film or textile carrier, a filler of carbon fibers, fiberglass, organic fibers or minerals forming a mat. A binder may be dispersed over the mat and a second carrier applied. The mat is subjected to heat and pressure to soften the carriers and binder so they penetrate into the interstices of the filler and binds mechanically with them and the carriers and binder bind chemically with each other to form the stiffening layer. A polymer is then extruded over the stiffening layer, which may be used flat, provided with holes or punches for composite action with the polymer, formed into a profile, or segmented to provide spaced-apart stiffening layers.

18 Claims, 5 Drawing Sheets

Related U.S. Application Data continuation of application No. 15/950,809, filed on Apr. 11, 2018, now abandoned, which is a continuation of application No. 15/501,492, filed as application No. PCT/US2016/062451 on Nov. 17, 2016, now Pat. No. 9,981,411.

(60) Provisional application No. 62/256,513, filed on Nov. 17, 2015.

(51) Int. Cl.

| | |
|---|---|
| *B29C 55/18* | (2006.01) |
| *B29C 43/34* | (2006.01) |
| *B29C 43/46* | (2006.01) |
| *B29C 48/05* | (2019.01) |
| *B29C 48/15* | (2019.01) |
| *B29C 48/30* | (2019.01) |
| *B29C 48/34* | (2019.01) |
| *B29C 48/21* | (2019.01) |
| *B29C 48/154* | (2019.01) |
| *B29C 55/06* | (2006.01) |
| *B29C 48/156* | (2019.01) |
| *B29C 48/00* | (2019.01) |
| *B29K 105/12* | (2006.01) |
| *B29C 43/18* | (2006.01) |
| *B29K 27/06* | (2006.01) |
| *B29C 48/305* | (2019.01) |
| *B29L 31/00* | (2006.01) |
| *B29K 105/04* | (2006.01) |
| *B29K 105/26* | (2006.01) |
| *B29C 48/285* | (2019.01) |
| *B29C 48/07* | (2019.01) |
| *B29C 48/12* | (2019.01) |

(52) U.S. Cl.
CPC .......... *B29C 48/0018* (2019.02); *B29C 48/05* (2019.02); *B29C 48/15* (2019.02); *B29C 48/154* (2019.02); *B29C 48/156* (2019.02); *B29C 48/21* (2019.02); *B29C 48/30* (2019.02); *B29C 48/304* (2019.02); *B29C 48/34* (2019.02); *B29C 55/06* (2013.01); *B29C 55/18* (2013.01); *B29C 48/0022* (2019.02); *B29C 48/07* (2019.02); *B29C 48/12* (2019.02); *B29C 48/2886* (2019.02); *B29C 48/307* (2019.02); *B29C 2043/188* (2013.01); *B29K 2027/06* (2013.01); *B29K 2105/04* (2013.01); *B29K 2105/12* (2013.01); *B29K 2105/26* (2013.01); *B29L 2031/001* (2013.01); *B29L 2031/005* (2013.01)

(58) Field of Classification Search
CPC .......... B29C 48/30; B29C 48/34; B29C 48/21; B29C 48/154; B29C 48/304; B29C 43/52; B29C 55/18; B29C 43/34; B29C 43/46; B29C 48/2886; B29C 48/0022; B29C 48/07; B29C 48/12; B29C 48/307; B29C 2043/188; B29L 2031/005; B29L 2031/001; B29K 2105/04; B29K 2105/26; B29K 2105/12; B29K 2027/06
See application file for complete search history.

(56) References Cited

U.S. PATENT DOCUMENTS

| | | | | |
|---|---|---|---|---|
| 4,938,823 | A * | 7/1990 | Balazek | B29C 70/521 156/166 |
| 5,738,935 | A * | 4/1998 | Turk | B32B 27/308 428/304.4 |
| 6,197,412 | B1 * | 3/2001 | Jambois | B29C 70/088 428/297.4 |
| 6,257,281 | B1 * | 7/2001 | Nie | F16L 9/12 138/137 |
| 2003/0096096 | A1 | 5/2003 | Jo et al. | |
| 2004/0221384 | A1 * | 11/2004 | Tavivian | E05D 5/0246 4/596 |
| 2007/0126142 | A1 * | 6/2007 | Zhou | B29C 70/523 264/134 |
| 2007/0149080 | A1 * | 6/2007 | Asahara | B29C 43/12 442/239 |
| 2008/0145681 | A1 * | 6/2008 | Toas | C08J 5/18 428/500 |
| 2009/0094929 | A1 * | 4/2009 | Carlson | B29C 48/151 52/656.2 |
| 2009/0317649 | A1 * | 12/2009 | Smith | B32B 27/08 428/516 |
| 2010/0080980 | A1 * | 4/2010 | Maheshwari | B29C 70/086 428/320.2 |
| 2012/0028032 | A1 * | 2/2012 | Chmielewski | B32B 27/306 428/319.3 |
| 2013/0161456 | A1 * | 6/2013 | Adams | A47C 7/002 248/188.9 |

* cited by examiner

| STRIP # | WIDTH | DIR.* | Y DISTANCE | W*Y | Y-Y' | (Y-Y')^2 | (Y-Y')^2*W | W^3/12 |
|---|---|---|---|---|---|---|---|---|
| 82 | 1.320 | 0 | 0.920 | 1.214 | .438 | 0.192 | 0.254 | 0.000 |
| 84 | 1.740 | 0 | 0.400 | 0.696 | -0.082 | 0.007 | 0.012 | 0.000 |
| 86 | 0.420 | 0 | 0.110 | 0.046 | -0.372 | 0.138 | 0.058 | 0.000 |
| 88 | 0.420 | 0 | 0.110 | 0.046 | -0.372 | 0.138 | 0.058 | 0.000 |
| 90 | 0.420 | 0 | 0.110 | 0.046 | -0.372 | 0.138 | 0.058 | 0.000 |
| 92 | 0.420 | 1 | 0.520 | 0.218 | 0.038 | 0.001 | 0.001 | 0.074 |
| 94 | 0.420 | 1 | 0.520 | 0.000 | 0.038 | 0.001 | 0.001 | 0.074 |
|  |  |  |  | 0.000 | -0.482 | 0.232 | 0.000 | 0.000 |
|  |  |  |  | 0.000 | -0.482 | 0.232 | 0.000 | 0.000 |
|  |  |  |  | 0.000 | -0.482 | 0.232 | 0.000 | 0.000 |
|  |  |  |  | 0.000 | -0.482 | 0.232 | 0.000 | 0.000 |
|  |  |  |  | 0.000 | -0.482 | 0.232 | 0.000 | 0.000 |
|  |  |  |  | 0.000 | -0.482 | 0.232 | 0.000 | 0.000 |
|  |  |  |  | 0.000 | -0.482 | 0.232 | 0.000 | 0.000 |
|  |  |  |  | 0.000 | -0.482 | 0.232 | 0.000 | 0.000 |
| TOTALS | 5.160 |  |  | 2.486 |  |  | 0.441 | 0.148 |
| Y' = | 0.482 |  |  |  |  | I(TOTAL) = |  | 0.589 |

* - DIRECTION (COLUMN D): ENTER "1" IF VERTICLE, "0" IF HORIZONTAL

FIG.5C

STRUCTURAL COMPOSITION AND METHOD

TECHNICAL FIELD

The disclosure relates to polymeric composites. More particularly, the disclosure relates to reinforced polymeric compositions.

BACKGROUND

In many applications requiring structural members such as studs, beams, decking, framing members, trim pieces, and railings, polymeric materials have replaced wood. Window frames and shutters are made of hollow vinyl profiles. Interior molding and, more recently, screen doors, are made of foamed polyvinyl chloride.

Plastics have advantages over wood, including lower cost and lower maintenance, but often do not have the inherent strength of wood without incorporating other materials, such as wood or metal inserts, as secondary reinforcements to increase stiffness. Adding these types of secondary reinforcements increases the cost of material and labor and introduces complexity because of the additional type of material required.

Structural composites are well known. For example, U.S. Pat. No. 4,910,067, discloses a structural composite material comprising a foam core with a thermoplastic layer on one side and a layer of fibrous material on the other. The foam is formed from a liquid resin, which cures in contact with the fibrous material, impregnating and bonding it into a fiber-reinforced structure. A process for manufacturing the composite is taught in this prior art reference.

U.S. Pat. No. 5,700,555 teaches a composite article comprising a first zone made entirely of plastic and a second zone made of plastic plus 10% to 55% natural fiber, both of which are formed by co-extrusion. The fiber-containing zone includes embossing to resemble wood grain and is sufficiently porous to accept paint or stain to simulate the appearance of natural wood.

U.S. Pat. Nos. 5,738,935 and 5,858,522, are related to each other and to U.S. Pat. No. 5,700,555, described above, and disclose a process for the preparation of a natural fiber and thermoplastic composite and the resulting products therefrom. The process includes the steps of mixing the synthetic fiber and the thermoplastic in a blender with a porosity aid and an interfacial agent to form a mixture; adding the mixture to a heated extruder; extruding the mixture as a composite; and shaping the composite in a vacuum calibration device to a desired profile. The process further includes the step of co-extruding a second thermoplastic onto the natural fiber/thermoplastic composite for some applications (e.g., windows, doors and siding).

EP 0599404 discloses a process for preparing thermoplastic composites reinforced with continuous fibers. The process includes the steps of: (a) unwinding a continuous filament, constituted by a bundle of fibers, from a bobbin; (b) opening the continuous filament, essentially by disassembling it into its individual continuous fibers; (c) dipping and driving the open filament through a stationary bed consisting of a thermoplastic polymer powder contained in a tank that is submitted to continuous vibration; and (d) reassembling the filament and arranging around it a sheltering flexible sheath made of a thermoplastic polymer.

EP 0653290, discloses a continuous process for producing a molded thermoplastic fiber-reinforced article having a high resin concentration in at least one surface by coating the surface of that heated fiber mat core with a melted first thermoplastic resin, and then passing the fiber mat core into an extrusion zone wherein a melted second thermoplastic resin is extruded onto it. Then the fiber mat core and thermoplastic resin are molded into a finished article. The continuous process disclosed provides molded finished articles such as roof tile, automobile exterior panels, house siding, etc.

U.S. Pat. No. 5,565,056 discloses a glass fiber-reinforced building panel made by extruding molten first and second webs of polymer compounds through spaced die openings, positioning a mat of randomly oriented short glass fibers between the first and second webs, pressing the webs and mat together, and cooling the resulting building panel.

EP 0747213 discloses a panel comprising a first layer of polypropylene filled with sawdust, wood flour, or wood shavings and at least one additional layer consisting at least partially of fibrous thermoplastic material that are bonded to one face of the first layer by compression and simultaneous, partial fusion. This additional layer retains the fibrous pattern and structure.

U.S. Pat. No. 6,607,798 discloses a fiber-reinforced, hollow-center, composite hollow structure in which hollow center cores made of thermoplastic resin are joined into one body by intermediate layers containing reinforcing long fibers bonded to each other with a thermosetting resin. The structure is then covered with an outer layer of thermoplastic resin.

U.S. Pat. No. 9,079,380 discloses co-extrusion of polyvinyl chloride (PVC) with a composite material, forming a continuous strip which may then be cut into convenient lengths. The PVC forms mounting flanges and ventilation standoffs on the back surface only, with all parts on the front being formed of a composite of cellulose fiber and a thermoplastic resin.

A polymeric composition that has structural levels of stiffness and low manufacturing cost would be advantageous particularly if it conserved natural resources by recycling previously-used materials.

SUMMARY

Disclosed herein is a structural composite made primarily of polymeric material but which incorporates at least one reinforcing, stiffening layer in a continuous manufacturing process that results in a well-bonded, non-homogeneous composite. Thus, the appearance of the resulting composite and its durability preserve the advantages of polymeric materials and provide the strength of a reinforced composite for structural applications, and at low cost of manufacture.

The present method may be used to form a polymeric profile that has been engineered by designing the location and composition of one or more stiffening layers inside or on the profile so the composite has the requisite stiffness for its particular application. In addition, the method and materials are such that the cost of the manufacture of the composite may be low because the stiffening layer may be made of readily available recycled materials, including short fibers, and not compromise on strength or be adversely affect the exterior appearance of the structural composite.

The stiffening layer may be further modified by shaping it into a profile that extends in three dimensions or by modifying its surface with holes or punches to promote composite action with a polymer layer. The modified polymer layer is extruded over the stiffening layer to create the finished product. The polymer is chemically compatible with the carrier; that is, chemical bonds form between the polymer and the carrier that resist delamination.

The binding agent is also selected to bind chemically with the carrier, and to bind mechanically and also preferably chemically with the mat, and bind chemically with the extruded polymer profile. The binding of the layers adds strength and avoids delamination. An adhesive may be applied to the carrier to make the filler adhere better to the carrier.

A feature of the disclosure is that the pressing and heating steps are done using at least one pair of heated jacket rollers, and when a second pair of heated jacket rollers is used, the subsequent pair of rollers may be spaced closer together than the first pair to increase the flow of liquefied binder throughout the filler of the mat. The second pair of rollers may also be rotated faster than the first to stretch the mat before it cools. Stretching the mat helps to align the fibers and may result in a stronger stiffening layer.

Another feature of the disclosure is the use of recycled chopped carbon fibers or carbon fiber ribbon; chopped fiberglass fibers; anhydrite fibers derived from waste gypsum; fibers from textile waste or recycled cloth products including cotton, silk and synthetics; cellulose fibers from scrap wood, paper, cardboard or bamboo; metallic wire or other metal fibers; or any combination of the foregoing, as well as normally waste mineral components such as fly ash, zeolites and pozzolans. The fibers do not have to be long but can be short, such as shorter than the width of the mat.

Still another feature of the disclosure is that the carrier, the binder if used, and the polymer extruded over the carrier may also be made of recycled materials such as polyethylene terephthalate or high-density polyethylene for the carrier and binder and polyvinyl chloride for the extruded polymer. These materials are chemically compatible in that they tend to form chemical bonds between them.

Another feature of the disclosure is that the stiffening layer may comprise a plurality of types of fibers, at least one carrier and more than one filler layer.

Still another feature of the disclosure is that the fibers may be dispersed by shaking them onto the carrier as the carrier is rolling onto a conveyor, the resulting random orientation providing roughly equal strength across the carrier and parallel to its length.

Still another feature of the disclosure is that the polymer may be extruded over one or more stiffening layers as they are pulled through a crosshead die in accordance with an engineered configuration for the product being made.

Yet another feature of the disclosure is that the stiffening layers may either comprise one or more flat layers suitably spaced apart, formed into one or more three-dimensional profiles within the extruded polymeric matrix, or a combination of these, as may be convenient to manufacture while providing structural levels of shear and flexural strength.

These and other features and their advantages will be apparent to those skilled in the art of polymeric extrusions from a careful reading of the detailed description accompanied by the drawing.

BRIEF DESCRIPTION OF THE DRAWINGS

In the figures,

FIG. 4 is an example of a structural composite product, namely, a door jamb, made according to the present method and apparatus; and, FIG. 5A shows a cross-section taken from an end view of the structural member shown in FIG. 4; and, in FIG. 5B, the cross section of FIG. 5A is show with a zero axis 200 on the bottom of the cross-section; and, in FIG. 5C, the results of the sums of products divided by the sums of widths is presented in a table, yielding the location of the neutral axis 216 above zero axis 200, as indicated in FIG. 2B, illustrating an analysis of the distribution of reinforcement within a structural composite product that yields a conservative prediction of its stiffness and flexural strength.

DETAILED DESCRIPTION

The structural composite described herein is a non-homogeneous composition of matter having both compressive strength and stiffness, which enables it to be used as a substitute for wood in a wide variety of applications, including those where building code requirements apply. In addition, the present structural composite can substitute for other materials with higher strength modulus than wood, such as aluminum. The term non-homogeneous means that at least some of the constituents are concentrated within the structural composite rather than being homogeneously dispersed. The present composition may be engineered, meaning that its exterior shape and the choice of its components and their locations and shapes may be selected to meet the strength and stiffness required for specific tasks to which that composition is to be put. As a simple example, the present structural composite may be designed with reinforcement spaced away from the neutral axis, analogous to the flanges of an I-beam, providing increased strength and stiffness in one or both axes perpendicular to the cross-section. Because such a structural composite may be designed for load bearing, the composition is referred to herein as a structural composite.

Figure 1:
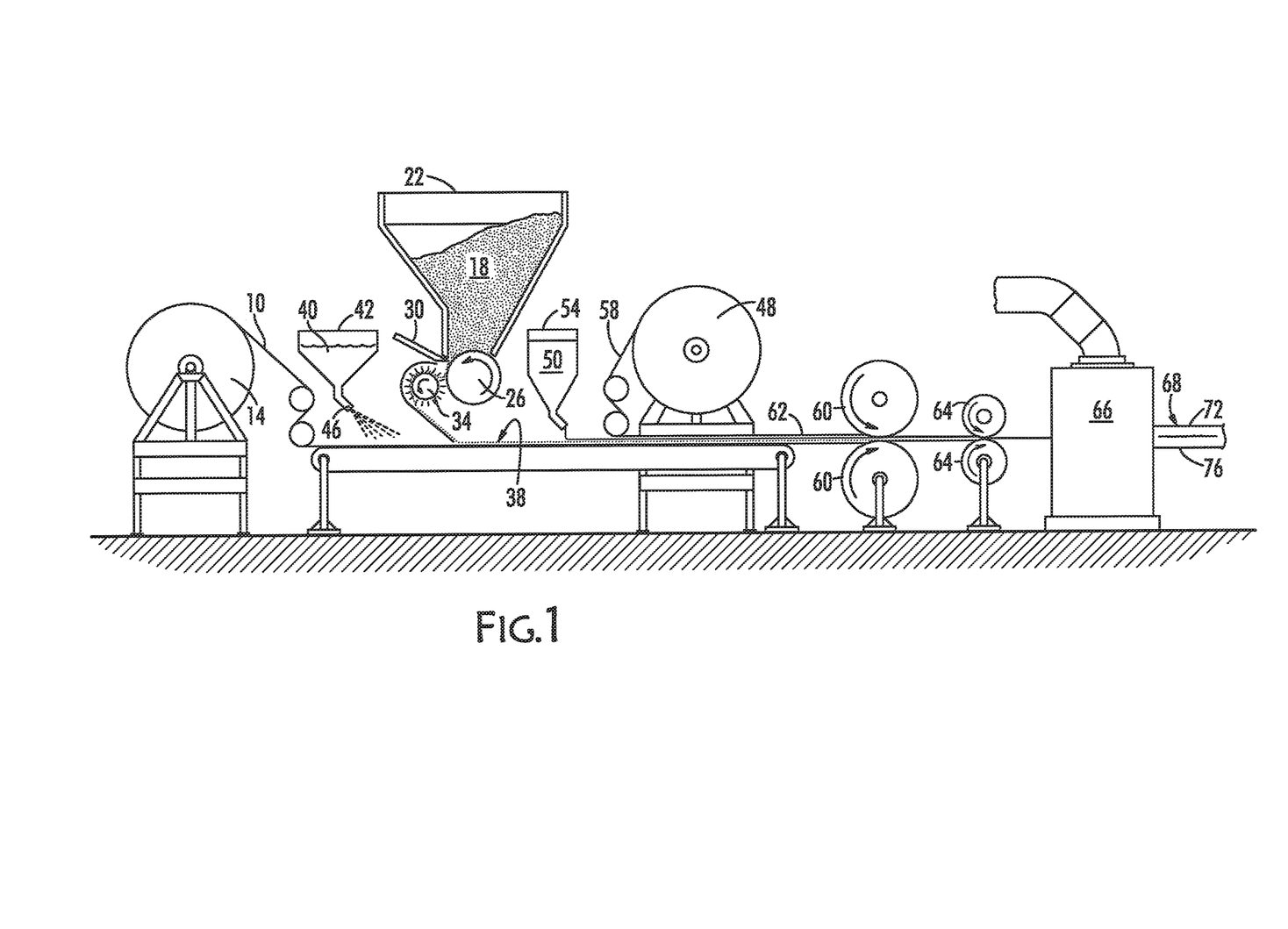
FIG. 1 is a schematic drawing of an apparatus for making the present structural composite.
Figure 2:
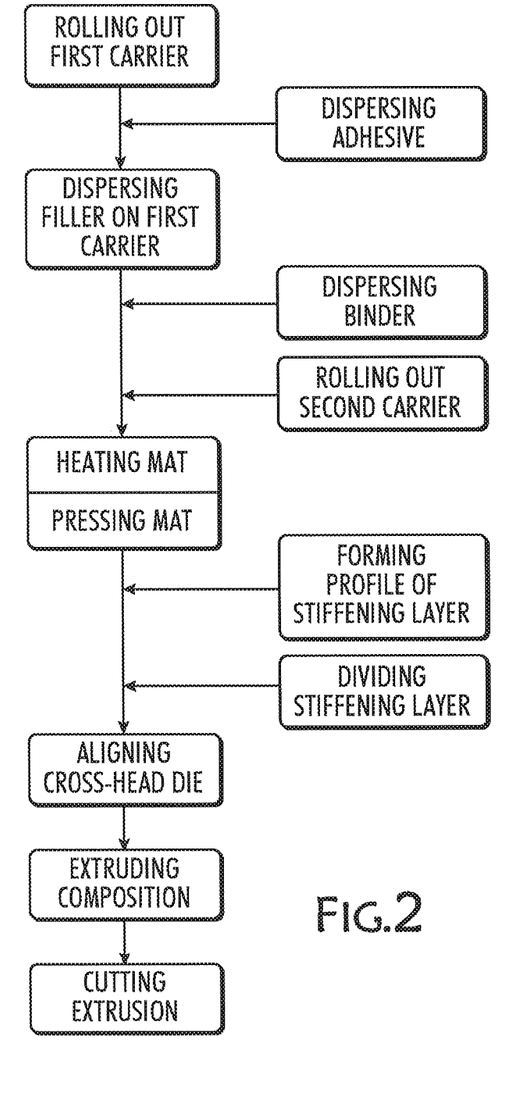
FIG. 2 is a flow diagram of the method for making the present structural composite.

Referring now to FIGS. 1 and 2, the present composition has at least one stiffening layer that increases the stiffness of the finished structural composite. A stiffening layer is incorporated into a polymeric extrusion either by extruding the polymer onto the stiffening layer so that the stiffening layer is on one side and the polymer on the other. The stiffening layer is then visible from the exterior. Alternatively, the stiffening layer is incorporated by extruding it so that the polymer partly or wholly surrounds the stiffening layer, in which case the stiffening layer may not be visible from the exterior.

The stiffening layer includes a first carrier 10. As used herein the term carrier means a fabric or film that is a continuous sheet of a pliable material, which may, for example, be wound onto a spool or core 14 so that it can be rolled out for use as part of a continuous manufacturing process. Carrier 10 may be made of high density polyethylene (HDPE) or polyethylene terephthalate (PET), or other materials that chemically or mechanically bind with the selected polymer, such as polyethylene terephthalate glycol-modified (PETG), which has properties useful in the present method, such as a low melting temperature. The density of HDPE in the present composition can range from 0.93 to 0.97 $g/cm^3$ or 970 $kg/m^3$.

If a fabric is used as carrier 10, the fabric may be woven or non-woven and is capable of serving as a surface on which to deposit other constituents of the stiffening layer, as will be presently described, and to bind mechanically and may also bind chemically with the polymer and a binder.

Filler 18 is dispersed onto carrier 10. Filler 18 may include manmade and natural fibers, organic matter, and minerals. If fibers are used as filler 18, they may be recycled, chopped carbon fibers or carbon fiber ribbon; waste fiberglass fibers; anhydrite fibers derived from waste gypsum; fibers from textile waste or recycled cloth products including cotton, silk and synthetics; cellulose fibers from scrap wood, paper, cardboard or bamboo; metallic wire or other metallic fibers; or any combination of the foregoing. Minerals such as zeolites, pozzolans, and fly ash, which is a waste from coal burning, may also be used as filler, and other substances that alter the characteristics of the stiffening layer, facilitate the manufacturing process, or simply add bulk. The polymer may be polyvinyl chloride.

When fibers are used as filler 18, the fibers may be of any length. Chopped carbon fiber and fiberglass fibers work well and may be more cost-effective for most applications than long fibers, particularly if they are a waste product from other manufacturing operations. Similarly, anhydrite whiskers can be made economically from gypsum, which is a waste product of many industrial processes, are extremely strong, and will bond chemically to polyvinyl chloride (PVC) especially if pretreated with polyvinyl alcohol and glutaraldehyde. A mixture of long and short fibers may also be used as filler 18. In one aspect, filler 18 will form a layer that nearly fills first carrier 10 from side to side and is as long as carrier 10.

The dispersion of the material of the filler 18 may be achieved by any method that produces a distribution of material over much of first carrier 10, such as by shaking or spreading filler 18 onto first carrier 10 as first carrier 10 is being rolled out. For example, a quantity of filler 18 may be placed into a hopper 22. As filler 18 descends to the bottom of hopper 22, a roller 26 moves the lowermost filler past a blade 30 that controls the amount of filler 18 passed forward. The filler then falls onto a brush roller 34. Brush roller 34 brushes filler 18 onto first carrier 10 as first carrier 10 moves.

To assist in the establishment of a mat 38 of filler 18 on first carrier 10, an adhesive 40 may be applied to first carrier 10 prior to the dispersion of filler 18. Adhesive 40 in a hopper 42 may be sprayed through a nozzle 46 onto carrier 10 before filler 18 is dispersed. If mat 38 is built up in layers, perhaps using a sequence of hoppers 22, additional adhesive spraying may be done to form the filler layer to a designed depth and uniformity.

The quantity of filler 18 that may be used to form mat 38 depends on the purpose for the composite product, including its mechanical properties, and the choice of filler or fillers that are available and their characteristics and price. Accordingly, the quantity of filler 18 dispersed onto first carrier 10 may have a thickness of at least a centimeter.

A binder 50 may be applied to mat 38 on first carrier 10. Binder 50 may be in the form of a liquid or of a powder that, when heated, forms a liquid. Binder 50 is dispersed onto mat 38 so that it falls into gaps and spaces on the surface of mat 38 that is formed by the deposited filler 18. Binder 50 may be applied in any manner that is suitable for its distribution, such as spraying, shaking, dripping, or blowing from a hopper 54. Binder 50 may be a material selected to be compatible with first carrier 10, such as HDPE or PET (PETG or PETE) and may be in the form of a mist, a liquid, a powder, or granules such as ground, recycled PETG.

A second carrier 58 may be applied on top of mat 38 from a second core 48. Second carrier 58 may be made of the same material as first carrier 10, such as HDPE or PET (PETG or PETE). First carrier 10 and filler 18, and optionally with binder 50 and adhesive 40 combine to form a stiffening layer 62.

Stiffening layer 62 is passed through heated jacket rollers 60, 64, which apply heat and pressure to soften and liquefy first carrier 10, binder, 50, and second carrier 58 so that they flow throughout filler 18 of mat 38. Jacket rollers 60, 64, may be used to both heat and press, or heating may be done by a separate means first, such as infrared heaters, followed by pressing. More than one set of jacket rollers 60, 64, may be used. Jacket rollers 60, 64, may be spaced apart so that mat 38 with carriers 10 is compressed in stages when passing between them. Jacket rollers 64 may be spaced closer together than jacket rollers 60 to apply incrementally more pressure in order to infuse binder 50 throughout mat 38 so binder 50 penetrates into mat 38 and binds with first and second carriers 10, 58.

Optionally, successive sets of jacket rollers 60, 64, may rotate at successively faster speeds, thereby stretching stiffening layer 62 while it is still cooling thereby partially aligning the fibers of filler 18, especially if they are chopped fibers, in the direction of stretching in a manner analogous to the fibers in wood, thus imparting greater strength to layer 62 comparable to that achievable with long fibers.

Binder 50 binds to filler 18 and may bind mechanically or chemically to first and second carriers 10, 58, depending on the choice of materials of first and second carriers 10, 58. If first and second carriers 10, 58, are films of PET (PETG or PETE) or HDPE, binder 50 made of this same material will bind with it chemically. If carrier 10 is a fabric, the binding may be mechanical as binder penetrates between the threads and fibers of the fabric.

Chemical binding herein means that chemical bonds are formed between the atoms or molecules of two different materials. Mechanical binding, or composite action, is used to mean that a fluid material flows around a solid material and when cooled, captures the solid material into the matrix of the cooled material.

Stiffening layer 62, as described above, may be made in a batch process or in a continuous extrusion process.

Once first and second carriers 10, 58, and binder 50 have cooled, stiffening layer 62 moves forward to a cross-head die 66 where one or more polymer layers 72, 76 are extruded over it to form a structural composite 68. Polymer layers 72, 76 may be polyvinyl chloride extruded with or without a foaming agent.

More than one stiffening layer 62 may be included in structural composite 68 either by forming a plurality of stiffening layers 62 or by forming one stiffening layer 62 and cutting it into narrower strips. Stiffening layer 62 may be used as a thin flat layer (as made), or may be deformed if desired to have a third dimension to provide multi-dimensional stiffness. Stiffening layer 62 may be cut into two or more strips or portions that are preferably spaced apart in pairs or groups to impart greater flexural strength than would be achievable had the same stiffening layer 62 been used in one piece or even if strips cut from stiffening layer 62 had been placed in closer proximity.

Stiffening layer 62 may be modified prior to being pulled through cross-head die 66 to provide mechanical binding between stiffening layer 62 and the polymer layers 72, 76. By forming holes in stiffening layer 62 or punches, both of which drive portions of stiffening layer 62 outside of the plane otherwise defined by stiffening layer 62, polymer may flow into and across the plane defined by stiffening layer 62 and thereby increase the interlock between stiffening layer 62 and polymer layers 72, 76. These modifications may be made by additional rollers, dies, punch presses or cutters through which stiffening layer 62 is passed.

After structural composite 68 has been extruded, it is cut into desired lengths by traveling saws, lasers, water jets, or other cutting devices.

A method for making a structural composite is illustrated schematically in FIG. 2. The method includes the step of rolling out first carrier 10, which may be made of plastic film or fabric. Filler 18 is dispersed onto first carrier 10 to form a mat 38. An adhesive 40 may be applied to first carrier 10 in order to hold the material comprising filler 18 in place on first carrier 10. A binder 50 may also be dispersed onto mat 38.

Once mat 38 is formed, it is subjected to heat to melt first carrier 10 and binder 50 if used so that they flow into filler 18. To urge the liquefied first carrier 10 and binder 50 to flow into filler 18, mat 38 is pressed. These two steps can be done at the same time using pairs of heated jacket rollers 60, 64, which both heat and press mat 38. Moreover, heated jacket rollers 60, 64, can stretch mat 38 if jacket rollers 64 are made to rotate slightly faster than preceding jacket rollers 60. Stretching mat 38 while binder 50 is solidifying tends to align filler 18 to improve stiffness. The incremental speed of jacket heater rollers 64 may be determined by a modest amount of experimentation.

The completed stiffener layer 62 may then be formed to have a profile that provides stiffness in more than one direction. The term profile means that the-stiffener layer is bent or formed from a two-dimensional layer to extend in a third dimension as well, such as a U-shape, a W-shape, or L-shape. The completed stiffener layer 62 may also be cut into strips or segments that are positioned to improved overall stiffness in different directions. The strips may be spaced apart and away from the neutral axis of the composite structural element before adding the polymer. A cross-head die may be used for extruding the polymer around the strips of the stiffener layer 62.

Referring now to FIGS. 3A-3H, there are shown some representative ways by which a stiffening layer or layers may be distributed within a composite product. For simplicity, each structural composite is shown as a simple rectangular cross-section in which a stiffening layer or layers are shown in the polymer. By convention in engineering analysis, external loading is shown by an arrow pointed in a downward direction.

Figure 3A:
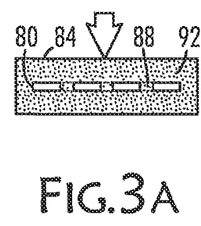
FIG. 3A-3H illustrate examples of reinforcement configurations and positions for enhanced stiffness and flexural strength.

In the example shown in FIG. 3A, a stiffening layer 80 runs generally parallel to and midway between the top and bottom surfaces of a relatively thin finished composite article 84. To increase the stiffness of stiffening layer 80, it is perforated with holes 88 through which polymer 92 can flow to secure itself to stiffening layer 80 by composite action, which is the binding effect that occurs when stiffening layer 80 is incorporated into the matrix of polymer 92.

Figure 3B:
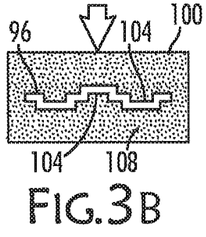

In the example shown in FIG. 3B, a single stiffening layer 96 runs generally parallel to and midway between the top and bottom surfaces of a relatively thin finished composite article 100. To increase the stiffness of stiffening layer 96, it may be punched from one side or two sides, as shown, to have depressions 104 that also result in composite action between stiffening layer 96 and the matrix of polymer 108.

Figure 3C:
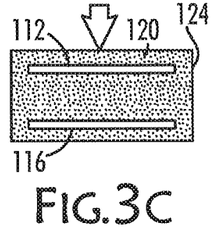

FIG. 3C shows a simple and highly effective reinforcing distribution of stiffening layers 112, 116, in a polymeric matrix 120, according to an aspect of the disclosure. Stiffening layers 112,116 are set horizontally, parallel to each other and perpendicular to the direction of loading, and spaced apart in that direction within the cross-section of a composite article 124. The result behaves much like a steel I-beam, in which thick horizontal flanges at top and bottom are separated by a typically thinner vertical steel web. When loaded from above, the I-beam's upper flange, stiffening layer 112, is placed in compression perpendicular to the beam's cross-section, while the lower flange, stiffening layer 116, is placed in tension. Since each point along the width of stiffening layers 112, 116, experiences similar tension or compression, the full width may be loaded to nearly the failing stress of the composition of composite article 124 before failure occurs.

Figure 3D:
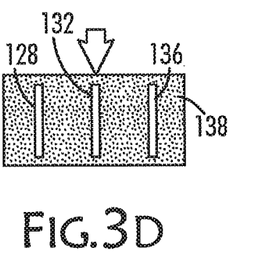

FIG. 3D shows another simple distribution, here with a plurality of stiffening members 128, 132, 136, set vertically, parallel to the direction of loading. While this configuration takes less advantage of geometry, since only the edges of each stiffening member 128, 132, 136, in a polymer 138, can be loaded close to the failing stress while portions nearer the center experience less loading, it may still be useful in many cases.

Figure 3E:
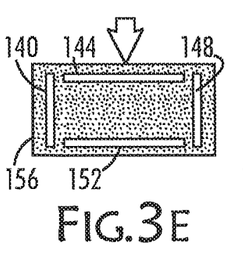

Example FIG. 3E shows a combination of vertical and horizontal stiffening layers 140, 144, 148, 152, forming a box-like composite article 156 able to withstand loading from a variety of directions before failure.

Figure 3F:
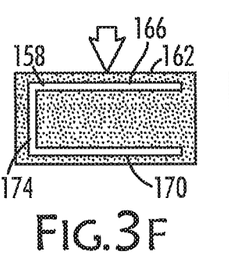

FIG. 3F shows a single stiffening layer 158 in a composite article 162. Stiffening layer 158 has been folded into a three-dimensional shape comprising top and bottom reinforcing planes 166, 170, joined by a vertical web 174. In some cases, it may be convenient for a manufacturer to deform a single stiffening layer 158 in this manner rather than to cut it apart.

Figure 3G:
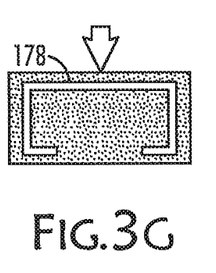
Figure 3H:
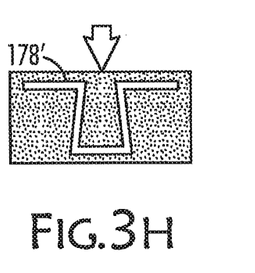

FIGS. 3G and 3H show alternative ways of folding a single stiffening layer 178, 178' into a three-dimensional profile having greater horizontal symmetry than the configuration shown in FIG. 3F. In addition, since fiber-containing reinforcement is typically stronger in tension than in compression, where, if not adequately supported, it tends to crumple, these profiles place a greater amount of the stiffening material at the top to take the compression while a smaller amount is placed at bottom to accept the tension. Mechanical engineers may recognize especially the distribution shown in FIG. 3G since, when fabricated in steel, with minor modifications, it forms the channel structure for UNI-STRUT (a trademark of Atkore International) and similar steel framing systems.

Figure 4:
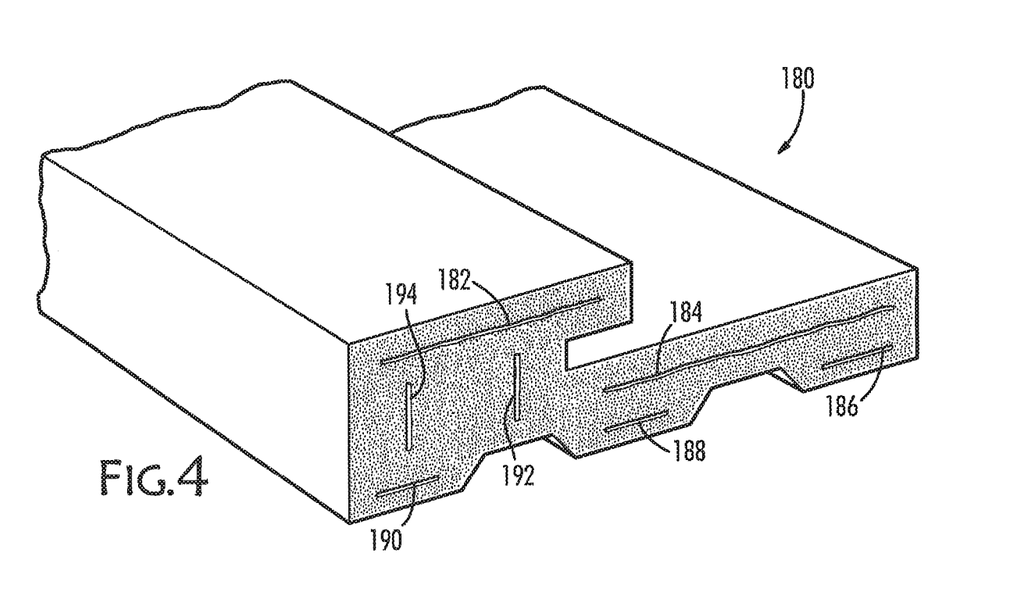

Referring now to FIG. 4, there is shown a composite product 180 for a door jamb, formed using the present method and incorporating a plurality of stiffening layers 182, 184, 186, 188, 190, 192, and 194 each comprising a narrow strip potentially separated from an originally wider stiffening layer. Stiffening layers 182, 184, 186, 188 and 190 and the spacing apart of stiffening layers 192 and 194 provide stiffness chiefly in the horizontal direction, while stiffening layers 192, 194 and the spacing apart of stiffening layers 182,190 and 184, 186, 188 provide stiffness in the vertical direction. Stiffening layers 182, 184, 186, 188, 180, 192, and 194 do not have to be flat, as shown, and may be curved or formed in any other shape as may be convenient for manufacture while providing the required shear and flexural strength for a given application.

A simple method for estimating the stiffness and flexural strength of an article made using aspects of the disclosure exists so any distribution of stiffening layer or layers may be evaluated and an optimal configuration selected. The method is based on one often found in engineering textbooks for calculating the bending of beams, and specifically in E. P. Popov, *Mechanics of Materials*, Second Edition, © 1976 by Prentice-Hall, Inc, though here simplified for convenience. Simplifications are conservative, tending slightly to underestimate stiffness and strength for a greater safety factor.

Figure 5A:
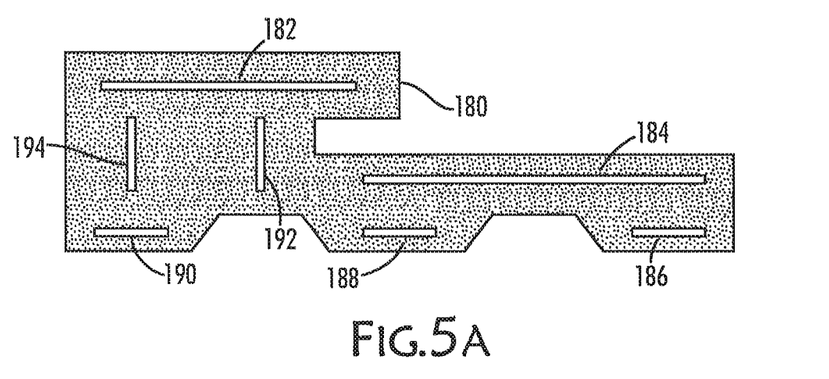

For purposes of illustration, a cross-section of the structural member shown in FIG. 4 is shown again in FIG. 5A. Loading is assumed to come from above, and stiffness and flexural strength in this direction will be estimated. For stiffness and flexural strength in resisting a force from any other direction, the cross-section may simply be rotated placing the force direction once again at top.

The cross-section is first drawn, either at actual size or at some convenient integral fraction (½, ⅕, etc.) or multiple (2, 5, etc.) thereof, either on graph paper or, more preferably, on a computer screen running a design application such as CAD. This may be done, for example, by tracing over a photograph or drawing as shown in FIG. 5A, followed by scale adjustment.

Figure 5B:
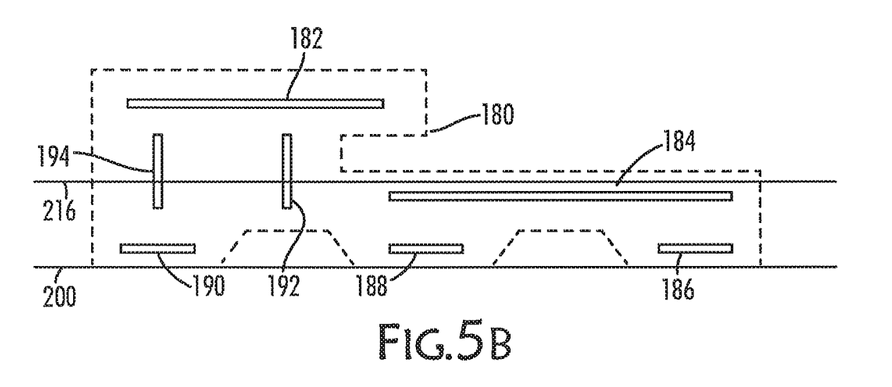

The enclosing polymer is then "removed" from the drawing (in other words, and conservatively, no credit is taken for any strength or stiffness it may contribute). A zero axis 200 is drawn, anywhere on the drawing although most conveniently at the bottom, as shown in FIG. 5B.

The width, W, of each stiffening layer (here, 182 through 194) and its distance Y from zero axis are measured, expressed in actual (non-scaled) inches, and recorded in tabular format, for example in a spreadsheet, along with an "h" or "v" showing whether the stiffening layer is oriented horizontally or vertically since at a later stage of analysis the two will be treated differently. In using a spreadsheet, "h" is conveniently replaced with "0", and "v", with "1."

Figure 5C:
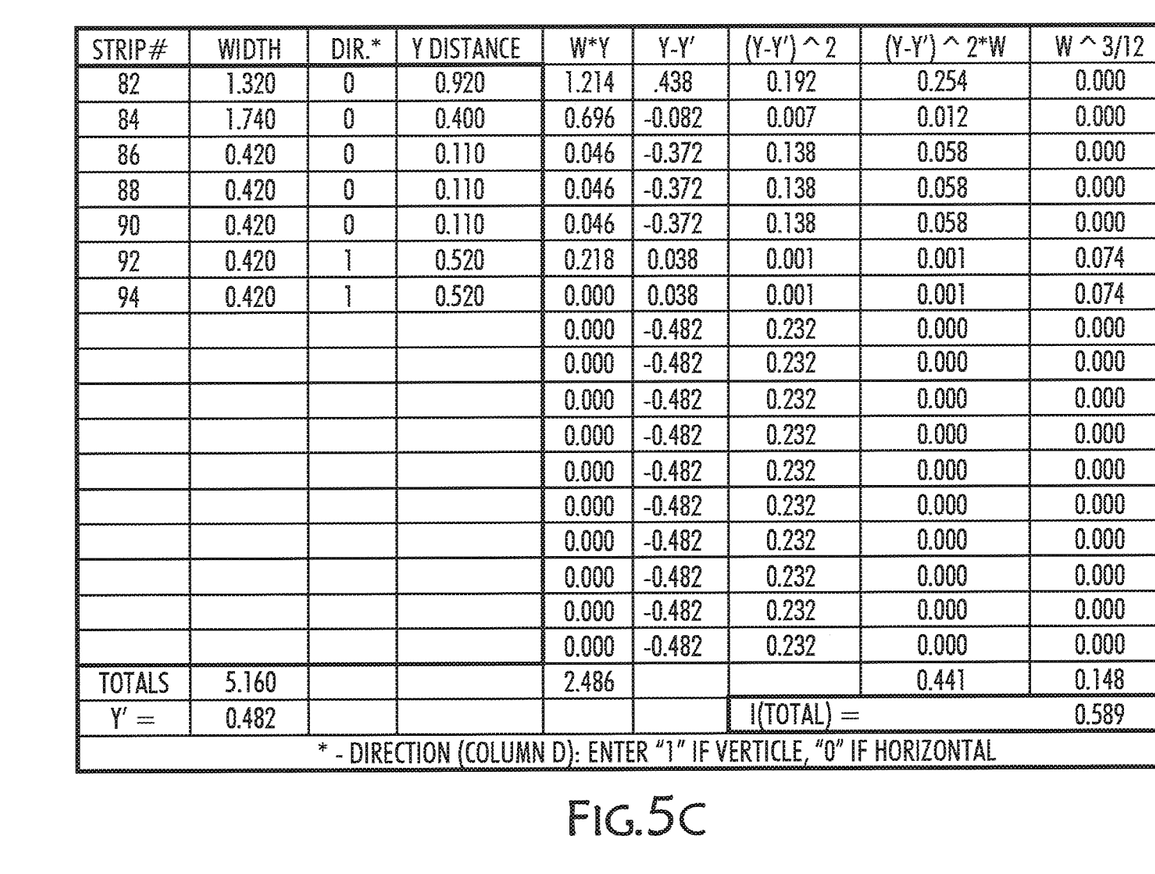

For each layer, W and Y are multiplied together. The widths are also summed, the products of W and Y are summed, then the sum of products is divided by the sum of widths to find the location of the neutral axis 216 above zero axis 200:

$$Y' = \Sigma(W*Y)/\Sigma W,$$

as shown in the table at the right of FIG. 5C.

For the example, neutral axis 216 is located 0.482 inch above the zero axis. A line representing the neutral axis 216 is then added to the drawing. The distance Y−Y' of each stiffening layer from the neutral axis is found, squared, then multiplied by the width:

$$(Y-Y')^2 * W.$$

This expression represents the relative contribution of each layer to the overall stiffness and flexural strength.

As is obvious from the table of FIG. 5C, those layers furthest from the neutral axis contribute disproportionately while the contributions of those near it may be so small as to be negligible. This feature of the disclosure demonstrates an advantage over the known prior art, in that the placement of the stiffening material can be varied so as to achieve the greater stiffness and flexural strength even when using short fibers, mixtures of long and short fibers, and mixtures of different kinds of fibers. Also, because the stiffening member can be cut, a single width of stiffening member can provide several stiffening layers in a single extrusion through a cross-head die.

For vertical stiffening layers only, since their strength is distributed over a range of distances from the neutral axis, one further step is needed. The width of such a layer is cubed, then divided by 12. Structural engineers will recognize this as the formula for the moment of inertia of a rectangular beam $I=bh^3/12$, shorn of its base term since, conservatively and for simplicity, all stiffening layers are treated here as simple planes. Using "1" in the spreadsheet to represent a vertical stiffening layer invokes this extra step, while for a horizontal stiffening layer the "0" causes it to be omitted.

All of the $(Y-Y')^2*W$ terms, and for vertical layers only the $W^3/12$ terms, are summed to obtain the total moment of inertia:

$$I_{total} = \Sigma(Y-Y')^2 * W + \Sigma_{vert} W^3/12.$$

The result is given in units of length cubed. For the example analyzed, the result is 0.589 inches cubed. Moments of inertia are normally expressed in dimensions of length to the fourth power. The difference here is due to the use of pounds per inch of width, rather than pounds per square inch, for the strength and elasticity of the stiffening layer.

A conservative estimate of the structural member's stiffness can be found by multiplying $I_{total}$ by the elastic modulus E of the stiffening layer material, again expressed in pounds per inch of width. For samples produced according to the method disclosed, E is about 550,000 pounds per square inch. A typical thickness of 0.08 inch then yields 44,000 pounds per inch of width. Accordingly, the stiffness of the structural member just analyzed is conservatively estimated at 44,000 lbf/in*0.589 in³=25,916 in²lbf, which replaces the usual EI (I=moment of inertia in in⁴) in most structural calculations.

For example, the maximum deflection of a center-loaded beam supported at the ends (neglecting the weight of the beam itself) is normally calculated as $$v_{max} = PL^3/48EI,$$

where P is the loading in pounds, L the beam's length in inches, and E and I are as defined above. Taking P as 1 pound and L as 96 inches, and replacing EI with 25,916 in²lbf yields a deflection, $v_{max}$, equal to 1*64³/25,916=0.711 inch, a reasonable value.

Similarly, the flexural strength of a beam—the maximum bending moment it can support without damage—is normally found as $$M_{max} = \sigma_{max} * I_{total}/c,$$

where $\sigma_{max}$ is the maximum allowable stress in pounds per square inch and c is the distance from neutral axis 216 to the most distant load-bearing element.

In this simplified approach, $\sigma_{max}$ is the tensile or compressive strength of the stiffening layer in pounds per inch of width. This is desirably reduced by 20% to provide a known safety factor. $I_{[subtotal]}$ are found in FIG. 5C replaces I. An expected $\sigma_{max}$ for carbon-fiber-reinforced PET according to the method disclosed is 100,000 lb/in², which with a thickness of 0.08 inch translates to 6400 pounds per inch of width. The greatest distance Y-Y' for the example in FIG. 5 is 0.438 inch. Again using $I_{total}$=0.451 in³ yields a value $M_{max}$ equal to 6400 lbf/in*0.589 in³/0.438 in=8606 inch-pounds of bending moment allowable. This is a surprisingly high value for a small reinforced composite article like a door jamb—certainly higher than would be expected for natural wood—but realistic based on the performance of samples tested.

An advantage of the disclosed composition and method over all known prior art is thus made clear: the flexibility of stiffening layer placement made possible is tractable using simple mathematics, readily implemented via a spreadsheet, to evaluate and optimize placement within a composite article or structural member in order to achieve virtually any desired stiffness or flexural strength with great economy of materials. This advantage is all the more evident in light of the fact that the method disclosed can be carried out with recycled materials.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements besides the listed elements. Although this disclosure has been described with respect to specific embodiments, the details of these embodiments are not to be construed as limitations.

What is claimed is:

1. A method for making a structural composite, said method comprising:
   (a) providing a first carrier;
   (b) distributing filler onto said first carrier;
   (c) applying a binding agent onto said filler, said binding agent being chemically compatible with said first carrier;
   (d) applying a second carrier that is a fabric over said first carrier;
   (e) heating said first carrier, said filler, said binding agent, and said second carrier;
   (f) pressing said first carrier, said filler, said binding agent and said second carrier together, wherein said binding agent and said first carrier penetrate into said filler and said second carrier, and bind mechanically with said filler and said second carrier to form a stiffening layer as said first carrier, said filler, said second carrier and said binding agent cool;
   (g) forming said stiffening layer into a shape providing strength; and
   (h) then extruding a polymer onto said stiffening layer through a cross-head die, wherein said polymer covers said stiffening layer, said polymer binding chemically with said stiffening layer, and wherein said cross-head die positions said stiffening layer with respect to said polymer to reinforce said polymer.

2. The method of claim 1, wherein said binding agent is a liquid.

3. The method of claim 1 wherein said binding agent is granular.

4. The method of claim 1, further comprising the steps of:
   (a) cutting said stiffening layer into strips; and
   (b) separating said strips before extruding said polymer.

5. The method of claim 4, wherein said structural composite has a neutral axis and wherein said strips are positioned away from, and on opposing sides of, said neutral axis of said structural composite.

6. The method of claim 1, wherein said filler includes fibers.

7. The method of claim 1, wherein said filler includes synthetic fibers.

8. The method of claim 1, wherein said filler includes minerals.

9. The method of claim 1, wherein said [fibers are] filler includes anhydrite whiskers.

10. The method of claim 1, wherein said polymer is polyvinyl chloride.

11. The method of claim 1, wherein at least one of said first carrier and said second carrier is made of polyethylene terephthalate.

12. The method of claim 1, wherein at least one of said first carrier and said second carrier is made of high-density polyethylene.

13. The method of claim 1, wherein an adhesive is applied to said filler.

14. A method for making a structural composite, said method comprising:
   (a) providing a first carrier;
   (b) dispersing filler onto said first carrier;
   (c) dispersing a binding agent onto said first carrier;
   (d) applying a second carrier that is a fabric onto said first carrier;
   (e) heating said first carrier, said binding agent, and said second carrier to liquefy said first carrier and said binding agent;
   (f) pressing said first carrier, said filler, said binding agent, and said second carrier together, wherein said first carrier and said binding agent penetrate through said fabric and into said filler, and wherein said first carrier and said binding agent bind mechanically with said filler and said fabric to form a stiffening layer as said first carrier, said binding agent, said filler and said second carrier cool; and
   (g) then extruding a polymer over said stiffening layer through a cross-head die to position said stiffening layer to reinforce said polymer, said polymer binding with said stiffening layer chemically to form a structural composite that resists delamination.

15. The method of claim 14, further comprising the step of deforming said stiffening layer.

16. The method of claim 14, further comprising the step of punching said stiffening layer on at least one side of said stiffening layer.

17. The method of claim 14, further comprising the step of forming holes in said stiffening layer.

18. The method of claim 14, wherein said stiffening layer is shaped and positioned prior to extrusion to reinforce said polymer as a structural composite.

* * * * *